United States Patent [19]

Seitz

[11] 4,082,739
[45] Apr. 4, 1978

[54] FIBRE-REACTIVE DYESTUFF CONTAINING A BIS-TRIAZINYLAMINO

[75] Inventor: Karl Seitz, Oberwil, Basel-land, Switzerland

[73] Assignee: Ciba-Geigy AG, Basel, Switzerland

[21] Appl. No.: 427,896

[22] Filed: Dec. 26, 1973

Related U.S. Application Data

[63] Continuation of Ser. No. 208,412, Dec. 15, 1971, abandoned.

[51] Int. Cl.² .................... C09B 62/06; C09B 62/08; D06P 1/382; D06P 3/66
[52] U.S. Cl. .................... 260/146 T; 260/153; 544/181; 544/204
[58] Field of Search ............... 260/153, 146 T

[56] References Cited

U.S. PATENT DOCUMENTS

| | | | |
|---|---|---|---|
| 3,108,846 | 10/1963 | Utsunomiya et al. | 260/153 X |
| 3,149,100 | 9/1964 | Hindermann et al. | 260/153 |
| 3,226,176 | 12/1965 | Hindermann et al. | 260/153 X |
| 3,261,825 | 7/1966 | Lesslie et al. | 260/153 |
| 3,309,345 | 3/1967 | Lutwack | 260/249.8 X |
| 3,362,948 | 1/1968 | Andrew et al. | 260/146 T |

FOREIGN PATENT DOCUMENTS 1,958,624 6/1970 Germany ............... 260/153

Primary Examiner—Floyd D. Higel
Attorney, Agent, or Firm—Edward McC. Roberts; Michael W. Glynn; Prabodh I. Almaula

[57] ABSTRACT

A dyestuff of the formula

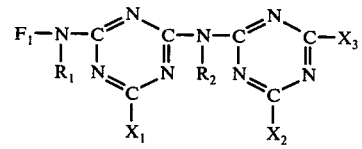

wherein $F_1$ represents a dyestuff radical, particularly an azo dyestuff radical, $R_1$ and $R_2$ represent hydrogen, lower alkyl, or aryl, $X_1$ and $X_2$ each represent halogen, and $X_3$ represents halogen, amino, lower alkyl amino, di-lower alkyl amino, lower alkoxy, phenoxy, lower alkylthio, or a group of the formula $-N(R_3)-F_2$ in which $R_3$ represents hydrogen, lower alkyl, or aryl and $F_2$ represents a dyestuff radical, particularly an azo dyestuff radical.

6 Claims, No Drawings

FIBRE-REACTIVE DYESTUFF CONTAINING A BIS-TRIAZINYLAMINO

CROSS-REFERENCE TO RELATED APPLICATIONS

This is a continuation of application Ser. No. 208,412, filed on Dec. 15, 1971 (now abandoned).

Reactive dyestuffs which contain two triazine or pyrimidine radicals bonded to each other through a diamine are known. In these dyestuffs there is always present a more or less large bridge member between the reactive radicals, and both reactive radicals are bonded to different nitrogen atoms.

The invention is based on the surprising discovery that it is possible to manufacture reactive dyestuffs which contain two triazine radicals which are bonded to each other through a single amino group, so that both reactive radicals are linked to the same nitrogen atom.

The present invention therefore relates to dyestuffs which contain two fibre-reactive triazine radicals which are bonded to each other through the nitrogen atom of an amino group.

The third substituent at the nitrogen atom of the amino group, which bonds the two reactive radicals to each other, may be a hydrogen atom or another radical, in particular an aliphatic or aromatic radical, preferably a low molecular alkyl radical, for example a methyl, β-methoxyethyl, ethyl or propyl radical, or a phenyl, alkylphenyl or naphthyl radical.

The reactive radicals can be bonded directly, or via a bridge member, to the remaining part of the compound. Exemplary of such bridge members are: —O—, —S—, CO—, —SO$_2$—, —NH—, —N(alkyl)—, —N(aryl)—, CONH—, —SO$_2$NH— and —SO$_2$N(alkyl)—. Preferably the reactive radical is bonded to the remaining part of the compound via an —N(R) -group, wherein R represents a low molecular alkyl radical, an aryl radical or especially a hydrogen atom.

As examples of the substituted or unsubstituted alkyl radicals defined by R there may be cited: low molecular alkyl radicals, such as methyl, ethyl, propyl and butyl, which may contain substituents such as methoxy, ethoxy and hydroxy groups.

The compounds according to the invention may also contain more than once a group of two reactive radicals which are bonded to each other through the nitrogen atom of an amino group.

Suitable compounds which contain reactive radicals of the kind described hereinbefore are all compounds belonging to groups of substances in whose use the formation of a particularly firm bond to a substrate, in particular a fibre material, is necessary or desirable. As such groups of substances there may be mentioned textile auxiliaries such, for example, as impregnating agents for giving a permanent finish to cellulose fibres (improving the resistance to creasing and shrinking), for "easy care" and the anti-felt finishing of wool, for imparting water-repellent and oil-repellent characteristics, for preventing fibres from becoming electrically charged (anti-static agents), for flame-proofing, for preservation (fungicides and insecticides) or for lessening soil retention and resists. Particularly important groups of substances which may be mentioned are fluorescent agents, optical brighteners and, above all, dyestuffs or compounds which are suitable as fixing components for dyestuffs free from reactive groups for the subsequent build up of dyestuffs on the fibre, for example for coupling.

The dyestuffs may be of any known class of dyestuffs and belong preferably to the mono- or polyazo series or to the nitro, anthraquinone or phthalocyanine series. They contain preferably at least one water-solubilizing group, in particular a carboxylic acid or sulphonic acid group. If desired, the dyestuffs may also contain coordinately bonded metal, for example coordinatively bonded copper, chromium or cobalt. In addition, basic dyestuffs are also suitable.

Preferred dyestuffs are those of the formula

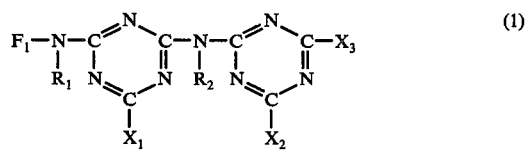

(1)

wherein F$_1$ represents the radical of a chromogen, R$_1$ and R$_2$ represent a hydrogen atom, an alkyl or aryl radical, X$_1$ and X$_2$ each represent a halogen atom and X$_3$ represents a halogen atom, an H$_2$N group, the radical of an amine, alcohol, phenol or mercaptan, or an —N(R$_3$)—F$_2$ group, in which R$_3$ represents a hydrogen atom, an alkyl or aryl radical and F$_2$ represents the radical of a chromogen. Where X$_3$ in formula (1) represents an —N(R$_3$)—F$_3$ group, the chromogen radicals F$_1$ and F$_2$ may be the same or different; preferred dyestuffs, however, are those in which F$_1$ and F$_2$ are similar radicals. Likewise R$_1$ and R$_3$, or R$_1$, R$_2$ and R$_3$, may be the same or different. Where X$_3$ represents an —N(R$_3$)—F$_2$ group, R$_1$ and R$_3$ are preferably the same, especially hydrogen atoms.

An important group of compounds according to the invention are the dyestuffs of the formula

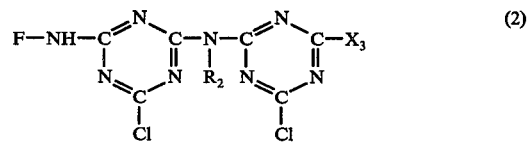

(2)

wherein F represents the radical of a chromogen of the anthraquinone, azo, phthalocyanine or nitroaryl series, R$_2$ represents a hydrogen atom, a low molecular alkyl radical or an aryl radical, and X$_3$ represents a chlorine atom, the H$_2$N group or the radical of an amine, alcohol, phenol or mercaptan.

Particular importance also attaches to the dyestuffs of the formula

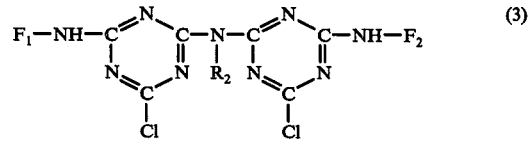

(3)

wherein F$_1$, F$_2$ and R$_2$ have the same meanings as assigned to them in the elucidation of the formula (1) or (2).

The invention relates furthermore to a process for the manufacture of compounds according to the invention, which process consists in condensing ammonia or a primary amine with halogenotriazines, and reacting the resulting products (provided at least one of the two acylating agents does not already possess a chromogen radical) optionally with compounds which contain a chromogen.

Suitable fibre-reactive triazine compounds are: 2,4,6-trichloro-(or -tribromo- or -trifluoro)-1,3,5-triazines, and 4,6-dichloro-(or dibromo- or difluoro)-1,3,5-triazines, which are substituted in the 2-position by an aryl or alkyl radical, for example a phenyl, methyl or ethyl radical, or by the radical of an aliphatic or aromatic mercapto compound which is bonded through the sulphur atom or of an aliphatic or aromatic hydroxyl compound which is bonded through the oxygen atom, or especially by an NH₂ group or by the radical of an aliphatic, heterocyclic, or aromatic amino compound which is bonded through the nitrogen atom. The following examples may be cited of compounds whose radicals may be bonded in the 2-position to the triazine nucleus by reaction with trihalogenotriazines: aliphatic or aromatic mercapto or hydroxyl compounds, such as thioalcohols, thioglycolic acid, thiophenols, alkoxyalkanols, methyl, ethyl, isopropylalcohol, glycolic acid, phenol, chloro- or nitrophenols, phenolcarboxylic and phenolsulphonic acids, naphthols, naphtholsulphonic acids etc, in particular ammonia and compounds containing acylatable amino groups, such as hydroxylamine, hydrazine, phenylhydrazine, phenylhydrazinesulphonic acids, glycolmonoalkyl ether, methyl, ethyl, isopropyl, methoxyethyl, methoxypropylamine, dimethyl, diethyl, methylphenyl, ethylenephenylamine, chloroethylamine, ethanolamine, propanolamine, benzylamine, cyclohexylamine, morpholine, piperidine, piperazine, aminocarbonic acid ester, aminoethyl acetate, aminoethanesulphonic acid, N-methylaminoethanesulphonic acid, but above all, aromatic amines, for example aniline, N-methylaniline, toluidine, xylidine, chloroaniline, p- or m-aminoacetanilide, aminophenols, anisidine, phenetidine and especially anilines which contain acid groups, sulphanilic, methanilic, orthanilic acids, aniline-disulphonic acid, aminobenzylsulphonic acid, aniline-ω-methanesulphonic acid, aminobenzenedicarboxylic acids, naphthylaminomono-, di- and trisulphonic acids, aminobenzoic acids, for example 2-hydroxy-5-aminobenzoic acid; also in addition coloured compounds, or compounds having dyestuff character, for example 4-nitro-4'-aminostilbene-disulphonic acid, 2-nitro-4'-amino-diphenylamino-4,3'-stilbene-disulphonic acid, 2-nitro-4'-aminodiphenylamino-4,3'-stilbene-disulphonic acid, and in particular aminoazo dyestuffs or aminoanthraquinones or phthalocyanines, which contain at least in addition a reactive amino group.

The introduction of the substituent in the 2-position of the triazine radical can also be effected after the condensation or after the reaction with the compound which contains the chromogen.

The condensation with the halogenotriazine is carried out advantageously in the presence of an acid acceptor, for example sodium carbonate, and in an organic solvent or at relatively low temperature in an aqueous agent. In all these reactions the procedure to be followed is such that at least one replaceable halogen atom is still left in the final product.

In the manufacture of the dyestuffs according to the invention it is advantageous to proceed in such a manner that initially 1 mol of ammonia or primary amine, for example aniline, is reacted with 1 mol of a halogenotriazine and the resulting product is subsequently condensed with 1 mol of the same or of another halogenotriazine. The reactions may be carried out in known manner in the presence of an agent which splits off acid, for example sodium hydroxide.

In this manner there are obtained compounds of the formula

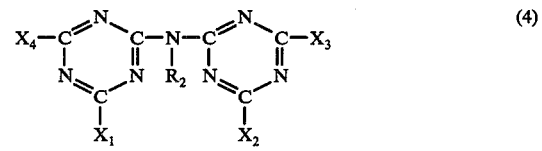

wherein $X_1$, $X_2$, $X_3$ and $R_2$ have the meanings assigned to them in the elucidation of the formula (1), and $X_4$ represents a halogen atom.

Primary amines are preferably used as amines, for example alkylamines, such as methylamine, ethylamine, propylamine, isopropylamine, butylamine, amylamine, β-chloro- or β-bromoethylamine, β-cyanoethylamine, β-hydroxyethylamine, γ-hydroxypropylamine, methoxymethylamine, β-methoxyethylamine, γ-methoxypropylamine, ethoxymethylamine, β-ethoxyethylamine, γ-ethoxypropylamine, γ-isopropoxypropylamine, benzylamine or arylamines, such as aniline, or ammonia itself.

The thus obtained bis-reactive group of the formula (4) is subsequently reacted with a dyestuff which contains at least one acylatable —NHR group, wherein R represents a hydrogen atom, an alkyl or aryl radical.

By proceeding thus compounds of the formulae 1 to 3, for example, are obtained.

The reaction is carried out in known manner, preferably likewise in the presence of an acid acceptor.

The dyestuff compounds of the azo series used as starting products and which contain at least one —NHR group can be obtained by various processes. One process consists in diazotising an aromatic primary amine and coupling the resulting diazonium compound with a coupling component containing an —NHR group. As examples of aromatic primary amines which may be used in this manner to obtain the aminoazo compounds there may be mentioned aniline, o-, m- and p-toluidines, o-, m- and p-anisidines, o-, m and p-chloroanilines, 2:5-dichloroaniline, α- and β-naphthylamine, 2:5-dimethylaniline, 5-nitro-2-aminoanisole, 4-aminodiphenyl, aniline-2-, 3- and 4-carboxylic acids, 2-aminodiphenylether, 2-, 3- or 4-aminobenzene sulphonamide or sulphomonomethyl- or ethylamides or sulphondimethyl- or sulphondiethylamides, dehydrothio-p-toluidine monosulphonic acid or dehydrothio-p-toluidine disulphonic acid, aniline-2-, -3- and -4- sulphonic acids, aniline-2:5-disulphonic acid, 2:4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline -2-sulphonic acid, and 5-methoxyaniline-2-sulphonic acid, 2:5-dichloroaniline-4-sulphonic acid, 2-naphthylamine-4:8- and 6:8-disulphonic acids, 1-naphthylamine-2-,4-,5-,6- or 7-monosulphonic acid, 1-naphthylamine-3:6-disulphonic acid, 2-naphthylamine-3:6- and 5:7-disulphonic acids, 2-naphthylamine-3:6:8-trisulphonic acid, m- and p-nitroaniline, 4-nitroaniline-2-sulphonic acid, 3-nitroaniline-6-sulphonic acid, m- or p-aminoacetanilide and 4-amino-2-acetylaminotoluene-5-sulphonic acid.

As example of coupling components which can be used there may be mentioned 2-amino- and 2-methylamino-5-naphthol-7-sulphonic acids, 2-amino and 2-methylamino-8-naphthol-6-sulphonic acids, 1-amino and 1-ethylamino-8-naphthol-6-sulphonic acids and corresponding 3:6- and 4:6-disulphonic acids, 1-($3^1$- or $4^1$-aminobenzoylamino)-8-naphthol-3:6- and 4:6-disulphonic acids, aniline, o- and m- anisidines, o- and m-toluidines, 2:5-dimethylaniline, 3-amino-4-methoxytoluene, 2:5-dimethoxyaniline, N-methylaniline, N-ethyl-o-toluidine, N-methyl-n-anisidine, 3-methylamino-4-methoxytoluene, 1-($3^1$-aminophenyl)-3-methyl-, carboxy-, and -carboethoxy-5-pyrazolone, 1-($4^1$-aminophenyl)-3-methyl-, -carboxy-, and -carboethoxy-5-pyrazolones and 1-($4^1$-amino-$3^1$-carboxyphenyl)-3-methyl-5-pyrazolone.

The aminoazo compounds which are to be used in the process of the invention are not restricted to compounds containing only one azo group. Disazo compounds which may be used may be obtained for example by tetrazotisation of an aromatic diamine containing two primary amino groups and coupling the tretrazo compound so obtained with 2 molecular proportions of one of the above-defined coupling components, or with 1 molecular proportion of each of two of the above-defined coupling components, or with 1 molecular proportion of one of the above defined coupling components and with 1 molecular proportion of a coupling component not containing an amino group. As examples of such aromatic diamines there may be mentioned benzidine, $3:3^1$-dimenthoxybenzidine, benzidine-$2:2^1$-disulphonic acid, benzidine-$3:3^1$-dicarboxylic acid, benzidine-$3:3^1$-diglycollic acid and $4:4^1$-diaminostilbene-$2:2^1$-disulphonic acid. Alternatively disazo or polyazo compounds may be obtained by the use of primary aromatic amines or diamines containing azo groups. As examples of such primary aromatic amines or diamines containing azo groups which may be used there may be mentioned 4-aminobenzene-$4^1$-sulphonic acid, $4^1$-amino-$2^1$methylphenylazo-2-naphthalene-4:8-disulphonic acid and 4-amino-5-methoxy-2-methyl-$4^1$-nitro-$2^1$-sulphoazobenzene.

Instead of starting from amines which are free from —NHR groups, it is also possible to couple a coupling component which optionally contains an —NHR group with a diazonium compound which contains an —NHR group. Such diazonium compounds may be obtained by methods known from the art, by the diazotisation of aromatic primary amines containing a second amino group or containing a mono-substituted amino group. As examples of such aromatic primary amines there may be mentioned p-phenylenediamine, 1:4-phenylenediamine-2-sulphonic acid, 1:4-phenylenediamine-2-carboxylic acid and 1:4-diaminophthalene-2-suphonic acid. As examples of coupling components which may be used in this manner there may be mentioned the coupling components listed above and also β-naphthol, 2-naphthol-6- or -7-sulphonic acid, 2-naphthol-3:6- or 6:8-disulphonic acid, 1-naphthol-4-sulphonic acid, 1-phenyl-3-methyl-5-pyrazolone, 1-($4^1$-sulphophenyl)-3-methyl-5-pyrazolone, 1-($2^1:5^1$-dichloro-$4^1$-sulphophenyl)-3-methyl-5-pyrazolone, 2-benzoylamino-5-naphthol-7-sulphonic acid, 1-benzoylamino-8-naphthol-3:6- or 4:6-disulphonic acid, phenol, p-cresol, acetoacetanilide and acetoacet-2-methoxy-aniline-5-sulphonic acid.

Further processes for the manufacture of the dyestuff compounds of the azo series containing an —NHR group and which may be used in the process according to the invention, consist in reducing a dyestuff which contains nitro groups or treating an azo or polyazo compound containing at least one acylamino group with aqueous acid or aqueous alkali in order to cause hydrolysis of the acylamino group or groups. Such azo or polyazo compounds may be obtained from aromatic primary amines and/or coupling components containing acylamino groups. As examples of such aromatic primary amines there may be mentioned monoacetylbenzidine, 4-amino-1-acetylaminonaphthalene-6-sulphonic acid, 4-amino-$4^1$-acetylaminodiphenyl-3-sulphonic acid, 4-amino-3-sulphoacetanilide, 3-amino-4-sulphoacetanilide and 4-amino-$4^1$-acetylamino-stilbene-$2:2^1$-disulphonic acid, and as examples of such coupling components there may be mentioned 2-acetylamino-5-naphthol-7-sulphonic acid, 2-N-acetyl-N-methylamino-5-naphthol-7-sulphonic acid, 2-acetylamino-and 2-N-acetyl-N-methylamino-8-naphthol-6-sulphonic acids and 1-acetylamino-8-naphthol-3:6- and 4:6-disulphonic acids.

As examples of dyestuff compounds of the anthraquinone series which may be used in the process of the invention there may be mentioned anthraquinone compounds containing a group of the formula —NHR as herein-before defined, attached to an alkylamino or an arylamino group which is itself attached to an alphaposition of the anthraquinone nucleus. As examples of such anthraquinone compounds there may be mentioned 1-amino-4-($4^1$-aminoanilino-)anthraquinone-$2:3^1$-disulphonic acid and the corresponding $2:3^1$:5- and $2:3^1$:6-trisulphonic acids, 1-amino-4-($4^{11}$-amino-$4^1$-benzoylaminoanilino)-anthraquinone-2:3-disulphonic acid and the corresponding-$2:3^1$:5-trisulphonic acid, 1-amino-4-[$4^1$-($4^{11}$-aminophenylazo-)anilino-]anthraquinone-$2:2^{11}$:5-trisulphonic acid, 1-amino-4-($4^1$-amino-$3^1$-carboxyanilino-)anthraquinone-2:5-disulphonic acid 1, amino-4-($3^1$-aminoanilino-)anthraquinone-$2:4^1$:5-trisulphonic acid and the corresponding $2:4^1$-disulphonic acid, 1-amino-$4^1$-[$4^{11}$-aminophenyl-)anilino-]-anthraquinone-$2:3^{11}$:5-trisulphonic acid, 1-amino-4-($4^1$-methylamino)anilinoanthraquinone-$2:3^1$-disulphonic acid and the corresponding $2:3^1$:5-trisulphonic acid, 1-amino-4($4^1$-n-butylamino)-anilinoanthraquinone-$2:3^1$-disulphonic acid. 1-amino-4-($4^1$-methylamino-$3^1$-carboxyanilino-) anthraquinone-2-sulphonic acid, 1-amino-4-($3^1$-betahydroxyethylamino-)anilinoanthraquinone-2:5-disulphonic acid, 1-($4^1$-aminoanilino)-anthraquinone-$2:3^1$-disulphonic acid and 1-amino-4-($4^1$-amino-$2^1$-methoxy anilino)anthraquinone-$2:3^1$-disulphonic acid.

Such dyestuff compounds of the anthraquinone series may themselves be obtained from anthraquinone compounds, containing a halogen atom or a nitro group attached to the appropriate alpha-position of the anthraquinone nucleus, or from the leuco derivative of a 1:4-dihydroxy, -diamino- or -aminohydroxyanthraquinone, by reacting the appropriate anthraquinone compound with at least one molecular proportion of an aliphatic or an aromatic diamine.

Dyestuff compounds of the phthalocyanine series which may be used in the process of the invention are preferably metal-containing phthalocyanines, such as copper phthalocyanines, containing at least one water-solubilising group such as a sulphonic acid group, and at least one group of the formula —NHR as hereinbefore defined. The —NHR group or groups may be attached directly to the benz-rings of the phthalocyanine nucleus or they may be attached thereto through a divalent bridging radical for example -phenylene-, —CO-phenylene, —SO$_2$-phenylene, —NH-phenylene, —S-phenylene, —O-phenylene, —CH$_2$S-phenylene-, —CH$_2$O-phenylene, —CH$_2$-phenylene-, —SCH$_2$-phenylene, —SO$_2$CH$_2$-phenylene, —SO$_2$NR$_1$-phenylene-CH$_2$—, —SO$_2$NR$_1$-arylene-, —NR$_1$CO$_1$-phenylene, —NR$_1$SO$_2$-phenylene, —SO$_2$O-phenylene-, —CH$_2$—, —CH$_2$NR$_1$-phenylene, —CH$_2$NH.CO-phenylene-, —SO$_2$NR$_1$-alkylene-, —CH$_2$NR$_1$-alkylene-, —CONR$_1$-phenylene-CH$_2$-, —CONR$_1$-arylene-, —SO$_2$— and —CO —. In the above divalent bridging radicals, R$_1$ stands for hydrogen, alkyl or cycloalkyl, arylene stands for an aromatic divalent bridging radical wherein the terminal valence bonds may be attached to the same or different nuclei, and alkylene stands for an aliphatic divalent radical which may include hetero-atoms such as nitrogen as well as carbon in the chain of atoms, for example it may stand for the radical.

and the phenylene groups may be substituted for example by halogen, alkyl and alkoxy.

As examples of aromatic divalent bridging radicals denoted by arylene there may be mentioned aromatic nuclei, for example a benzene nucleus, a naphthalene nucleus, an acridine nucleus and a carbazole nucleus, which nuclei may bear further substituents, and radicals of the formula

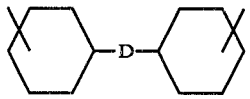

wherein the benzene rings may bear further substituents and wherein —D— stands for a bridging group, for example —CH=CH—, —NH—, —S—, —O—, —SO$_2$—, —NO=N—, —N=N—, —NH.CO.NH—, —CO.NH—, —O.CH$_2$CH$_2$O— and

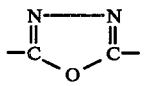

As specific examples of dyestuff compounds of the phthalocyanine series which may be used in the process of the invention there may be mentioned copper phthalocyanine-4-N-(4-amino-3-sulphophenyl-)-sulphonamide-4$^1$:4$^{11}$:4$^{111}$-trisulphonic acid, cobalt phthalocyanine-4:4$^1$-di-N(3$^1$-amino-4$^1$-sulphophenyl-)-carbonamide-4$^{11}$: 4$^{111}$-dicarboxylic acid and copper-4-(4$^1$-amino-3$^1$-sulphobenzoyl-)-)phthalocyanine.

There may also be used mixtures of aminophthalocyanines, for example there may be used a mixture of approximately equal parts of copper phthalocyanine-N-(4-amino-3-sulphophenyl-)sulphonamide trisulphonic acid and copper phthalocyanine di-N-(4-amino-3-sulphophenyl-)sulphonamide disulphonic acid.

The aminophthalocyanines which contain a sulphonic acid can be obtained either by the sulphonation of known phthalocyanines containing primary or secondary amino groups or by synthesis from mixtures of phthalic acid derivatives and sulphonated phthalic acid derivatives. Oleum, for example, is used as sulphonating agent e.g. a 20% solution of sulphur trioxide in sulphuric acid. They can also be obtained by heating together suitable derivatives of sulphonated phthalic acid and substituted phthalic acids by means of generally known methods, for example by heating together a mixture of 4-sulphophtalic anhydride and 4-p-nitrobenzoylphthalic anhydride, urea, cupric chloride and ammonium molybdate in o-dichlorobenzene at about 150° C. Phthalocyanines which are used as starting products can also be obtained by sulphonating the corresponding primary and secondary amines or by reacting a primary (or secondary N-alkyl or cycloalkyl)-nitroaniline with a phthalocyanine which contains chloromethyl and sulphonic acid or carboxylic acid groups. Such aminophthalocyanines can also be obtained by reacting a phthalocyanine containing chlorosulphonyl groups with a monoacetyl alkylene diamine in the presence of water, and treating the product so obtained (which contains both sulphonamide and sulphonic acid groups) with aqueous alkali to hydrolyse the acetylamino group: or by reacting a phthalocyanine containing chloromethyl and sulphonic or carboxylic acid groups with a monoacetyl alkylene diamine and treating the product so obtained with aqueous alkali to hydrolyse the acetylamino groups. They can furthermore be obtained by directly sulphonating or heating together a mixture of suitable carboxy or sulphophthalic acid derivatives with substituted phthalic acid derivatives, for example by heating the anhydrides with urea and a catalyst in an organic solvent and reducing the nitrophthalocyanine sulphonic or carboxalic acid or hydrolising the acylaminophthalocyanine sulphonic or carboxylic acid so obtained or by reacting a phthalocyanine compound containing carboxylic acid chloride groups with a diaminobenzene sulphonic acid or carboxylic acid or with an aminobenzene sulphonic acid or an aminobenzoic acid which also contains a nitro group and reducing the nitro compound so obtained; or finally by reacting a phthalocyanine compound containing carboxylic acid chloride groups with an N-aminobenzyl-) acetamide and subsequently hydrolising the product so obtained with aqueous alkali.

Dyestuff compounds of the nitro series which may be used in the process of the invention are preferably those of the formula:

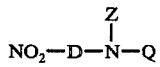

wherein D stands for a naphthalene or benzene nucleus which may be further substituted, the nitrogen atom N is in the ortho position to the nitro group, Z stands for hydrogen or for a hydrocarbon radical which may be substituted, Q stands for hydrogen or for an organic radical attached to the nitrogen through a carbon atom, provided that Q and Z are not both hydrogen, and wherein Q may be connected to Z when Z is a hydrocarbon radical or to D, in the ortho position to the nitrogen atom N, to form a heterocyclic ring, and which contain at least one group of the formula —NHR, as hereinbefore defined.

As specific examples of dyestuff compounds containing at least one —NHR group, as hereinbefore defined, which may be used in the process of the invention, there may be mentioned the compounds of the following classes without, however, limiting the classes to those specifically described.

1. Monoazo compounds of the formula:

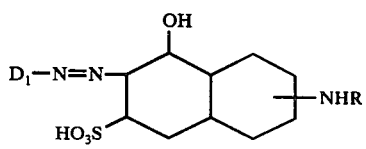

IV wherein $D_1$ represents an at most di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this case are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially these which contain a —$SO_3H$ group in ortho position to the azo link; the phenyl radical may be further substituted for example, by halogen atoms such as chlorine, alkyl radicals such as methyl, acylamino groups such as acetylamino and alkoxy radicals such as methoxy.

2. Disazo compounds of formula IV, wherein $D_1$ stands for a radical of the azobenzene, azonaphthalene or phenylazonaphthalene series and the naphtalene nucleus is substituted by the NHR group, and optionally by sulphonic acid as in class 1.

3. Monoazo compounds of the formula:

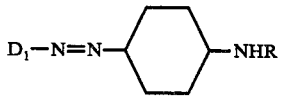

V wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic, acid and acylamino groups.

4. Mono- or dis-azo compounds of the formula:

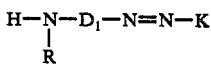

VI wherein $D_1$ represents an arylene radical such as a radical of the azobenzene, azonaphthalene or phenylazonaphthalene series, or preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

5. Mono or dis-azo compounds of the formula:

VII wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in α-position to the azo group.

6. The metal complex, e.g. the copper, chromium and cobalt complex compounds of these dyes of formulae IV, VI and VII (wherein $D_1$, K and $K_2$ have all the respective meanings stated) which contain a metallisable (for example, a hydroxyl, lower alkoxy or carboxylic acid) group ortho to the azo group in $D_1$.

7. Anthraquinone compounds of the formula:

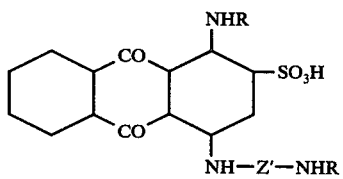

wherein the anthraquinone nucleus may contain an addition sulphonic acid group in the 5-, 6-, 7- or 8-position and $Z^1$ represents a bridging group which is preferably a divalent radical of the benzene series, for example phenylene diphenylene, or 4,4[1]-divalent stilbene or azobenzene radicals. It is preferred that $Z^1$ should contain one sulphonic acid group for each benzene ring present.

8. Phthalocyanine compounds of the formula:

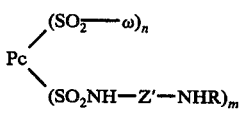

wherein Pc represents the phthalocyanine nucleus preferably of copper phthalocyanine, (1) represents —OH and/or —$NH_2$, $Z^1$ represents a bridging group, preferably an aliphatic, cycloaliphatic or aromatic bridging group, $n$ and $m$ each represent 1, 2 or 3 and may be the same or different provided that $n+m$ is not greater than 4.

9. Nitro dyestuffs of the formula:

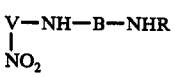

wherein V and B represent monocyclic aryl nuceli, the nitro group in V being ortho to the NH group.

In class 1
6-amino-1-hydroxy-2-(2[1]-sulphophenylazo)naphthalene-3-sulphonic acid,
6-methylamino-1-hydroxy-2-(4[1]-acetylamino-2[1]-sulphophenylazo)naphthalene-3-sulphonic acid.
8-amino-1-hydroxy-2-(2[1]-sulphophenylazo)naphthalene-3:6-disulphonic acid,
8-amino-1-hydroxy-2-(4[1]-chloro-2[1]-sulphophenylazo)naphthalene-3:5-disulphonic acid,
7-amino-2(2[1]:5[1]disulphophenylazo)-1-hydroxynaphthalene-3-sulphonic acid,
7-methylamino-2-(2[1]-sukphophenylazo)-1-hydroxynaphthalene-3-sulphonic acid, 7-methylamino-2-(4$^1$-methoxy-2$^1$-sulphophenylazo)-1-hydroxynaphthalene-3-sulphonic acid, 8-(3$^1$-aminobenzoylamino)1-hydroxy-2-(2$^1$-sulphophenylazo) naphthalene-3:6-disulphonic acid, 8-amino-1-hydroxy-2:2$^1$-azonaphthalene-1$^1$:3:5$^1$:6-tetrasulphonic acid, 8-amino-1-hydroxy-2:2$^1$-azonaphthalene-1$^1$:3:5$^1$-trisulphonic acid, 6-amino-1-hydroxy-2:2$^1$-azonaphthalene-1$^1$, 3,5$^1$-trisulphonic acid, 6-methylamino-1-hydroxy-2:2$^1$-azonaphthalene-1$^1$, 3,5$^1$-trisulphonic acid, 7-amino-1-hydroxy-2,2$^1$-azonaphthalene-1$^1$,3-disulphonic acid, 8-amino-1-hydroxy-2-(4$^1$-hydroxy-3$^1$-carboxyphenylazo)naphthalene-3,6-disulphonic acid.

6-amino-1-hydroxy-2-(4$^1$-hydroxy-3$^1$-carboxyphenylazo)naphthalene-3,5-disulphonic acid.

In class 2

8-amino-1-hydroxy-2-[4$^1$-(2$^{11}$-sulphophenylazo)-2$^1$-methoxy-5$^1$-methylphenylazo]naphthalene-3,6-disulphonic acid, 8-amino-1-hydroxy-2-[4$^1$-(4$^{11}$-methoxyphenylazo)-2$^1$-carboxyphenylazo]naphthalene-3,6-disulphonic acid, 8-amino-1-hydroxy-2-[4$^1$-(2$^{11}$-hydroxy-3$^{11}$,6$^{11}$-disulpho-1$^{11}$-naphthylazo)-2$^1$-carboxyphenylazo]naphthalene-3,6-disulphonic acid, 4,4$^1$-bis(8$^{11}$-amino-1$^{11}$-hydroxy-3$^{11}$,6$^{11}$-disulpho-2$^{11}$-naphthylazo)-3,3$^1$-dimethoxydiphenyl, 6-amino-1-hydroxy-2-[4$^1$-(2$^{11}$-sulphophenylazo)-2$^1$-methoxy-5$^1$-methylphenylazo]naphthahlene-3,5-disulphonic acid.

In class 3

2-(4$^1$-amino-2$^1$-methylphenylazo)-naphthalene-4:8-disulphonic acid, 2-(4$^1$-amino-2$^1$-acetylaminophenylazo)naphthalene-5:7-disulphonic acid, 4-nitro-4$^1$-(4$^{11}$-methylaminophenylazo)stilbene-2,2$^1$-disulphonic acid, 4-nitro-4$^1$-(4$^1$-amino-2$^{11}$-methyl-5$^{11}$-methoxyphenylazo)stilbene-2,2$^1$-disulphonic acid, 4-amino-4$^1$-(4$^{11}$-methoxyphenylazo)-stilbene-2,2$^1$-disulphonic acid, 4-amino-2-methylazobenzene-2$^1$:5$^1$-disulphonic acid.

In class 4

1-(2$^1$,5$^1$-dichloro-4$^1$-sulphophenyl)-3-methyl-4-(3$^{11}$-amino-4$^{11}$-sulphophenylazo)-5-pyrazolone, 1-(4-sulphophenyl)-3-carboxy-4-(4$^{11}$-amino-3$^{11}$-sulphophenyl azo)-5-pyrazolone, 1-(2$^1$-methyl-5$^1$-sulphophenyl)-3-methyl-4-(4$^{11}$-amino-3$^{11}$-sulphophenylazo)-5-pyrazolone, 1-(2$^1$-sulphophenyl)-3-methyl-4-(3$^{11}$-amino-4$^{11}$-sulphophenylazo)-5-pyrazolone, 4-amino-4$^1$-(3$^{11}$-methyl-1$^{11}$-phenyl-4$^{11}$-pyrazol-5$^{11}$-onylazo)stilbene-2,2$^1$-disulphonic acid.

4-amino-4$^1$-(2$^{11}$-hydroxy-3$^{11}$,6$^{11}$-disulpho-1$^{11}$-naphthylazo-stilbene-2,2$^1$-disulphonic acid, 8-acetylamino-1-hydroxy-2-(3$^1$-amino-4$^1$-sulphophenylazo) naphthalene-3,6-disulphonic acid, 7-(3$^1$-sulphophenylamino)-1-hydroxy-2-(4$^1$-amino-2$^1$-carboxyphenylazo)-naphthalene-3-sulphonic acid, 8-phenylamino-1-hydroxy-2-(4$^1$-amino-2$^1$-sulphonylazo) naphthalene-3,6-disulphonic acid, 6-acetylamino-1-hydroxy-2-(5$^1$-amino-2$^1$-sulphophenylazo) naphthalene-3-sulphonic acid.

In class 5

1-(3$^1$-aminophenyl)-3-methyl-4-(2$^1$:5$^1$-disulphophenylazo)-5-pyrazolone, 1-(3$^1$-aminophenyl)-3-carboxy-4-(2$^1$-carboxy-4$^1$-sulphophenylazo)-5-pyrazolone, 4-amino-4$^1$-[3$^{11}$-methyl-4$^{11}$-(2$^{111}$,5$^{111}$-disulphophenylazo)-1$^{11}$-pyrazol-5$^{11}$-onyl]stilbene-2,2$^1$-disulphonic acid, 1-(3-aminophenyl)-3-carboxy-4-[4$^{11}$-(2$^{111}$,5$^{111}$-disulphophenylazo)-2$^{11}$-methoxy-5$^{11}$-methylphenylazo]-5-pyrazolone.

In class 6

The copper complex of 8-amino-1-hydroxy-2-(2$^1$-hydroxy-5$^{11}$-sulphophenylazo)naphthalene-3:6-disulphonic acid, The copper complex of 6-amino-1-hydroxy-2-(2$^1$-hydroxy-5$^1$-sulphophenylazo)-naphthalene-3-sulphonic acid, The copper complex of 6-amino-1-hydroxy-2-(2$^1$-hydroxy-5$^1$-sulphophenylazo)-naphthalene-3,5-disulphonic acid, The copper complex of 8-amino-1-hydroxy-2-(2$^1$-hydroxy-3$^1$-chloro-5$^1$-sulphophenylazo)naphthalene-3,6-disulphonic acid, The copper complex of 6-methylamino-1-hydroxy-2-(2$^1$-carboxy-5$^1$-sulphophenylazo)naphthalene-3-sulphonic acid, The copper complex of 8-amino-1-hydroxy-2-[4$^1$-(2$^{11}$-sulphophenylazo)-2$^1$-methoxy-5$^1$-methylphenylazo]-naphthalene-3,6-disulphonic acid, The copper complex of 6-amino-1-hydroxy-2-[4$^1$-(2$^{11}$,5$^{11}$-disulphophenylazo)-2$^1$methoxy-5$^1$-methylphenylazo]-naphthalene-3,5-disulphonic acid, The copper complex of 1-(3$^1$-amino-4$^1$-sulphophenyl)-3-methyl-4-[4$^{11}$-(2$^{111}$,5$^{111}$-disulphophenylazo)-2$^{11}$-methoxy-5$^{11}$-methylphenylazo]-5-pyrazolone, The copper complex of 7-(4$^1$-amino-3$^1$-sulphoanilino)-1-hydroxy-2-[4$^{11}$-(2$^{111}$,5$^{111}$-disulphophenylazo)-2$^{11}$-methoxy-5$^{11}$-methylphenylazo]-naphthalene-3-sulphonic acid, The copper complex of 6-(4$^1$-amino-3$^1$-sulphoanilino)-1-hydroxy-2-(2$^{11}$-carboxyphenylazo)-naphthalene-3-sulphonic, acid, The 1:2-chromium complex of 7-amino-6$^1$-nitro-1,2$^1$-dihydroxy-2:1$^1$-azonaphthalene-3,4$^1$-disulphonic acid, The 1:2-chromium complex of 6-amino-1-hydroxy-2-(2$^1$-carboxyphenylazo)-naphthalene-3-sulphonic acid, The 1:2-chromium complex of 8-amino-1-hydroxy-2-(4$^1$-nitro-2$^1$-hydroxy-phenylazo)naphthalene-3,6-disulphonic acid, The 1:2-cobalt complex of 6-(4$^1$-amino-3$^1$-sulphoanilino-1-hydroxy-2-(5$^{11}$-chloro-2$^{11}$-hydroxyphenylazo)-naphthalene-3-sulphonic acid, The 1:2-chromium complex of 1-(3$^1$-amino-4$^1$-sulphophenyl)-3-methyl-4-(2$^{11}$-hydroxy-4$^{11}$-sulpho-1$^{11}$-naphthylazo)-5-pyrazolone, The 1:2-chromium complex of 7-(4$^1$-sulphoanilino)-1-hydroxy-2-(4$^{11}$-amino-2$^{11}$-carboxyphenylazo)naphthalene-3-sulphonic acid, The 1:2-chromium complex of 1-(3$^1$-amino-phenyl)-3-methyl-4-(4$^{11}$-nitro-2$^{11}$-carboxyphenylazo)-5-pyrazolone.

In class 7

1-amino-4-(3$^1$-amino-4$^1$-sulphoanilino)anthraquinone-2-sulphonic acid, 1-amino-4-(4$^1$-amino-3$^1$-sulphoanilino) anthraquinone-2,5-disulphonic acid, 1-amino-4-[4¹-(4¹¹-amino-3¹-sulphophenyl)anilino]anthraquinone-2:5-disulphonic acid 1-amino-4-[4¹-(¹¹-amino-2¹¹-sulphophenylazo)anilino]anthraquinone-2:5-disulphonic acid, 1-amino-4-(4¹-methylamino-3¹-sulphoanilino)anthraquinone-2-sulphonic acid.

In class 8 b  3-(3¹-amino-4¹-sulphophenyl)sulphamyl copper phthalocyanine-tri-3-sulphonic acid, Di-4-(3¹-amino-4¹-sulphophenyl)-sulphamyl copper phthalocyanine-di-4-sulphonic acid, 3-(3¹-aminophenylsulphamyl)-3-sulphamyl-copper phthalocyanine-di-3-sulphonic acid.

In class 9

4-amino-2¹-nitro-diphenylamine 3,4¹-disulphonic acid.

In the bis-reactive compounds according to the invention it is also possible optionally to replace reactive atoms, for example halogen atoms or replaceable groups, by non-reactive substituents subsequent to, or also before, the condensation with the amine or the dyestuff. However, this must be done in such a way that at least still one of the radicals bonded through the amino group remains reactive. This possibility is of particular importance for the halogenotriazines whose halogen atoms can be replaced by reaction with ammonia, an amine, alcohol, phenol or mercaptan. By proceeding in this manner compounds of the formula (1), for example, are obtained, wherein $X_1$ is an $H_2N$ group, the radical of an amine, alcohol, phenol or mercaptan, and $X_2$ or $X_2$ and $X_3$ represent halogen atoms, or wherein $X_1$ is a halogen atom and $X_2$ and $X_3$ each represent one of the non-reactive substituents cited hereinabove.

According to a further feature of the invention there is provided a modified process for the manufacture of the new dyestuffs which is applicable for the manufacture of azo dyestuffs. This process consists in coupling a diazotisable primary aromatic amine with a coupling component, the primary aromatic amine and the coupling component together having to contain at least one group of the formula (1).

This modified process of the invention may be conveniently brought about by adding sodium nitrite to a solution or suspension of the primary amine, which may be aminoazo compound, in a dilute aqueous solution of hydrochloric acid, adding the diazo solution or suspension so obtained to an aqueous solution of the coupling component and filtering off the dyestuff which is precipitated. If necessary sodium chloride can be added to ensure complete precipitation of all the azo dyestuff.

Those primary amines and coupling components which contain at least one group of Formula I may be obtained by condensing the corresponding primary amine or coupling component containing at least one amino group of the formula —NHR with a halide or anhydride as hereinbefore described.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates, and alkali metal salts of dialkylmetanilic acid such as sodium diethylmetanilate, which are preferably used in conjunction with sodium hydrogen sulphate.

The new dyestuffs obtained according to the invention are suitable for dyeing and printing materials of the most diverse kinds, for example silk, leather, wool, synthetic fibres made from superpolyamides, superpolyurethanes, polyhydroxylated materials, for example cellulosic materials of fibrous structure such as linen, cellulose, regenerated cellulose, cotton and the like. The dyestuffs are used preferably for the dyeing and printing of cellulose materials, in particular cotton, for example by the exhaust process from a dilute liquor, from an alkaline aqueous bath which optionally has a high salt content, and in particular by the pad dyeing process, in which the goods are impregnated with aqueous dyestuff solutions which optionally also contain salt and the dyestuffs are fixed, optionally with the application of heat, after a treatment with alkali or in the presence of alkali, The water-soluble reactive dyestuffs according to the invention are suitable for printing, particularly on cotton, but likewise also for the printing of nitrogen-containing fibres, for example wool, silk, or blended fabrics containing wool.

The dyestuffs are distinguished by their high reactivity, so that it is possible to obtain dyeings at a lower temperature or with a shorter fixing time than is customarily employed for comparable dyestuffs. High degrees of fixation and good bonding stability between dyestuff and fibre are achieved with the new dyestuffs. The dyeings which are obtained possess good fastness to wet processings, for example fastness to washing, lime or water, and furthermore, depending on the structure of the chromogen, easy release properties.

In order to improve the fastness to wet processings, it is advisable to subject the dyeings and prints obtained to a thorough rinsing with cold and hot water, optionally with the addition of an agent which acts as a dispersant and assists the diffusion of the non-fixed amounts of dyestuff.

The following Examples illustrate the invention, the parts and percentages being by weight unless otherwise stated. The ratio between parts by weight and parts by volume is the same as that between the gram and the cubic centimeter.

EXAMPLE 1

21.8 Parts of the dyestuff of the formula

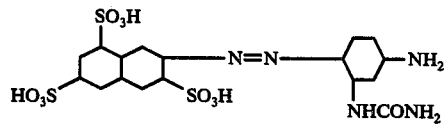

are dissolved neutral in 250 parts of water (which is at room temperature) with sodium hydroxide solution and the solution is treated with 13.1 parts of anhydrous sodium acetate. To the dyestuff solution is added, with vigorous stirring, a solution of 7.78 parts of N,N-bis-(4,6-dichloro-s-triazinyl)-(2))-aniline in 40 parts of acetone.

Upon completion of the acylation of the amino group the dyestuff is salted out with potassium chloride, filtered off and dried in vacuo at 50°–60° C. The resulting dyestuff dyes cotton in golden yellow shades.

Similar dyestuffs are obtained if instead of 7.78 parts of N,N-bis-(4,6-dichloro-s-triazinyl-(2))-aniline there are used corresponding amounts of:

N,N-bis-(4,6-dichloro-s-triazinyl-(2))-2'-chloroaniline,
N,N-bis-(4,6-dichloro-s-triazinyl-(2))-2'-methylaniline,
N,N-bis-(4,6-dichloro-s-triazinyl-(2))-2',4'-dimethylaniline,
N,N-bis-(4,6-dichloro-s-triazinyl-(2))-2',6'-dimethylaniline,
N,N-bis-(4,6-dichloro-s-triazinyl-(2))-ethylamine,
N,N-bis-(4,6-dichloro-s-triazinyl-(2))-methylamine or
N,N-bis-[4,6-dichloro-s-triazinyl-(2)]-amine.

EXAMPLE 2

17.52 Parts of the dyestuff of the formula

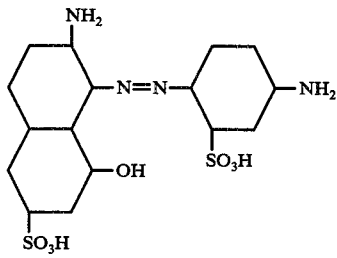

are dissolved neutral in 600 parts of water (which is at room temperature) and the dyestuff solution is reacted with 7.78 parts of N,N-bis-(4,6-dichloro-s-triazinyl-(2))-aniline according to the directions of Example 1.

Upon completion of the acylation, the precipitated dyestuff is filtered off and dried in vacuo at 50°–60° C. The resulting dyestuff dyes cotton in bluish red shades.

By reacting 2 equivalents of the dyestuffs containing amino groups listed in column I of the following Table with 1 equivalent of N,N-bis-[4,6-dichloro-s-triazinyl-(2)]-aniline, dyestuffs are obtained which dye cotton in the shades indicated in column II.

|   | I | II |
|---|---|---|
| 1 | 4-amino-2-methyl-5-methoxyazobenzene-2',5'-disulphonic acid | yellow |
| 2 | 2-(4'-amino-2'-methylphenylazo)-naphthalene-4,8-disulphonic acid | " |
| 3 | 2-(4'-amino-2'-acetylaminophenylazo)-naphthalene-5,7-disulphonic acid | golden yellow |
| 4 | 2-(4'-aminophenylazo)-naphthalene 4,6,8-trisulphonic acid | yellow |
| 5 | 2-(4'-amino-2'-methylphenylazo)-naphthalene-3,6,8-trisulphonic acid | golden yellow |
| 6 | 4-amino-4'-(2''-hydroxy-3'',6''-disulphonaphthylazo-[1'']-stilbene-2,2'-disulphonic acid | orange |
| 7 | 4-amino-4'-(4''-methoxyphenylazo)-stilbene-2,2'-disulphonic acid | reddish yellow |
| 8 | 4-amino-4'-(1'',2''-naphthylene)-triazole-stilbene-2,2',5'',7''-tetrasulphonic acid | yellow |
| 9 | 1-[naphthyl-(2')-azo]-4-(4''-aminophenylazo)-naphthalene-4',6',7',8'-tetrasulphonic acid | brownish orange |
| 10 | 4-nitro-4'-(4'''-methylaminophenylazo)-stilbene-2,2'-disulphonic acid | yellow |
| 11 | 4-amino-2'-nitrodiphenylamine-3,4'-disulphonic acid | " |
| 12 | 1-(2',5'-dichloro-4'-sulphophenyl)-3-methyl-4-(4''-amino-2''-sulphophenyl-azo)-5-pyrazolone | golden yellow |
| 13 | 1-(2',5'-dichloro-4'-sulphophenyl)-3-methyl-4-(5''-amino-2''-sulphophenyl-azo)-5-pyrazolone | greenish yellow |
| 14 | 1-[4',8'-disulphonaphthyl-(2')]-3-methyl-4-(5''-amino-2''-sulphophenyl-azo)-5-pyrazolone | yellow |
| 15 | 1-(4'-sulphophenyl)-3-carboxy-4-(5''-amino-2''-sulphophenylazo)-5-pyrazolone | |
| 16 | 1-(3'-aminophenyl)-3-methyl-4-(2'',5''-disulphophenylazo)-5-pyrazolone | " |
| 17 | 1-amino-4-(4'-aminoanilino)-anthraquinone-2,3-disulphonic acid | greenish blue |
| 18 | 1-amino-4-(3'-aminoanilino)-anthraquinone-2,4'-disulphonic acid | reddish blue |
| 19 | 1-amino-4-(3'-amino-2',4',6'-trimethylanilino)-anthraquinone-2,5'-disulphonic acid | " |
| 20 | 1-amino-4-(4'-amino-2',3',5',6'-tetramethylanilino)-anthraquinone-2,6-disulphonic acid | blue |
| 21 | 6-amino-1-hydroxy-2-(2'-sulphophenylazo)-naphthalene-3-sulphonic acid | orange |
| 22 | 6-methylamino-1-hydroxy-2-(4'-methoxy-2'-sulphophenylazo)-naphthalene-3-sulphonic acid | scarlet |
| 23 | 7-amino-2-(2',5'-disulphophenylazo)-1-hydroxynaphthalene-3-sulphonic acid | red |
| 24 | 8-amino-1-hydroxy-2-(2'-sulphophenylazo)-naphthalene-3,6-disulphonic acid | bluish red |
| 25 | 8-amino-1-hydroxy-2-(4'-methyl-2'-sulphophenylazo)-naphthalene-3,6-disulphonic acid | " |
| 26 | 8-amino-1-hydroxy-2,2'-azonaphthalene-1',3,5',6-tetrasulphonic acid | " |
| 27 | 1-hydroxy-2-(2',5'-disulphophenylazo)-8-(3''-aminobenzylamino)-naphthalene-3,5-disulphonic acid | scarlet |
| 28 | 8-acetylamino-1-hydroxy-2-(5'-amino-2'-sulphophenylazo)-naphthalene-3,6-disulphonic acid | red |
| 29 | 2-amino-8-hydroxy-1-(4'-amino-2'-sulpho(phneylazo)-naphthalene-3,6-disulphonic acid | bluish red |
| 30 | 2-hydroxy-1-(4'-amino-2'-sulphophenylazo)-naphthalene-6,8-disulphonic acid | red |
| 31 | 1-hydroxy-2-(4'-amino-2'-sulphophenylazo)-naphthalene-3,6-disulphonic acid | " |
| 32 | 1-hydroxy-2-(5'-amino-4'-methyl-2'-sulphophenylazo)-naphthalene-3,6-disulphonic acid | " |
| 33 | 1,8-dihydroxy-2-(5'-amino-2'-sulphophenylazo)-naphthalene-3,6-disulphonic acid | bluish red |
| 34 | 8-chloro-1-hydroxy-2-(5'-amino-2'-sulphophenylazo)-naphthalene-3,6-disulphonic acid | scarlet |
| 35 | 8-phenylamino-1-hydroxy-2-(4'-amino-2'-sulphophenylzao)-naphthalene-3,6-disulphonic acid | violet |
| 36 | 7-(3'-sulphophenylamino)-1-hydroxy-2-(4''-amino-2'',5''-disulphophenylazo)-naphthalene-3-sulphonic acid | brown |
| 37 | copper complex compound of 8-amino-1-hydroxy-2-(2'-hydroxy-5'-sulphophenylazo)-naphthalene-3,6-disulphonic acid | violet |
| 38 | copper complex compound of 8-amino-1-hydroxy-2-(1'-hydroxy-4',8'-disulphonaphthyl-[2'']-naphthalene-3,6-disulphonic acid | blue |
| 39 | copper complex compound of 8-amino-1-hydroxy-2-(2'-hydroxy-5'-amino-3'-sulphophenylazo)-naphthalene-5,7-disulphonic acid | " |
| 40 | copper complex compound of 8-amino-1-hydroxy-2-[2'-hydroxy-6'-aminonaphthyl-(1')-azo]-naphthalene-5,7,4'-trisulphonic acid | " |
| 41 | copper complex compound of 6-methylamino-1-hydroxy-2-(2'-hydroxy-5'-sulphophenylazo)-naphthalene-3-sulphonic acid | bluish red |
| 42 | copper complex compound of 8-amino-1-hydroxy-2-(2'-hydroxy-3'-chloro-5'-sulphophenylazo)-naphthalene-3,6-disulphonic acid | violet |
| 43 | copper complex compound of 6-(4'-amino-3'-sulphophenylamino)-1-hydroxy-2-(2''-hydroxy-3'',5''-disulphophenylazo)-naphthalene-3-sulphonic acid | violet |
| 44 | copper complex compound of 8-amino-1-hydroxy-2-(2'-hydroxy-3'-amino-5'-sulphophenylazo)-naphthalene-5,7-disulphonic acid | blue |
| 45 | copper complex of 2-(2',8'-dihydroxy-3',6'-disulphonaphthyl-1'-azo)-1-hydroxy-6-aminonaphthalene-4,8-disulphonic acid | blue |
| 46 | 2-(2',5'-disulpho-phenylazo)-7-(2''-sulpho-5''-amino-phenylazo)-1-amino-8-hydroxy-naphthalene-3,6-disulphonic acid | bluish green |
| 47 | copper-N-(2-hydroxy-phenyl-3,5-disulphonic acid)-N'-(2'-carboxy-4'-aminophenyl)-ms-2''-sulphophenylformazane | blue |

-continued

| | I | II |
|---|---|---|
| 48 | 1:2-chromium complex compound of 6-amino-1-hydroxy-2-(2'-carboxyphenylazo)-naphthalene-3-sulphonic acid | brown |
| 49 | 1:2-chromium complex compound of 8-amino-1-hydroxy-2-(2'-hydroxy-5'-nitrophenylazo)-naphthalene-3,6-disulphonic acid | dark blue |
| 50 | 1:2-cobalt complex compound of 8-amino-1-hydroxy-2-(2'-hydroxy-5'-nitrophenylazo)-naphthalene-3,6-disulphonic acid | corinth |
| 51 | mono-p-aminophenylamide of copper phthalocyanine-3,3',3'',3'''-tetrasulphonic acid | turquoise |
| 52 | copper phthalocyanine-trisulphonic acid-sulphonic acid-(3'-amino)-phenylamide | " |
| 53 | copper phthalocyanine-trisulphonic acid-sulphonic acid-(4'-amino-3'-sulpho)-phenylamide | " |
| 54 | copper phthalocyanine-disulphonic acid-disulphonic acid-(4'-amino-3'-sulpho)-phenylamide | " |
| 55 | copper phthalocyanine-trisulphonic acid sulphonic acid-(2'-amino)-ethylamide | " |

EXAMPLE 3

7.52 Parts of m-phenylenediamine-sulphonic acid are dissolved neutral in 250 parts of water (which is at room temperature) and the solution is treated with 13.1 parts of anhydrous sodium acetate. To the resulting solution is added with vigorous stirring a solution of 7.78 parts of N,N-bis-(4,6-dichloro-s-triazinyl-(2))-aniline in 40 parts of acetone and the whole mixture is allowed to react for about 24 hours. The mixture is filtered until clear and the reaction product is precipitated by addition of 20 vol % of potassium chloride and dried in vacuo at 50° C.

13.8 Parts of the so obtained diamine of the probable formula are dissolved in 400 parts of water and the solution is treated with 20 parts of 2N sodium nitrite solution and 10 parts of 10N hydrochloric acid, whereupon the tetraazo compound is partially precipitated in the form of crystals.

The resulting suspension of the tetra-azo compound is then poured into a neutral solution of 16.92 parts of 1-hydroxy-8-benzoylamino-naphthalene-3,6-disulphonic acid in 300 parts of water, which additionally contains 20 parts of sodium bicarbonate. Upon completion of the coupling the dyestuff is salted out with 15 vol. % of sodium chloride, filtered off and dried in vacuo at 60° C.

The so obtained dyestuff dyes cotton in bluish red shades.

If the tetra-azo compound described hereinabove is combined with the coupling components of column I of the following table, there are obtained dyestuffs which dye cotton in the shades indicated in column II.

| | I | II |
|---|---|---|
| 1 | 1-(2'-5'-dichloro-4'-sulphophenyl)-3-methyl-5-pyrazolone | greenish yellow |
| 2 | 1-ethyl-4-methyl-6-hydroxy-3-sulphomethyl-pyrid-(2)-one | strong greenish yellow |
| 3 | 6-ureido-1-hydroxy-naphthalene-3-sulphonic acid | orange |
| 4 | 1-(4'-sulphophenyl)-3-carboxy-5-pyrazolone | greenish yellow |
| 5 | barbituric acid | " |
| 6 | 8-acetylamino-1-hydroxynaphthalene-3,5-disulphonic acid | red |
| 7 | 2-hydroxynaphthalene-3,6-disulphonic acid | orange |
| 8 | 2-hydroxynaphthalene-6,8-disulphonic acid | " |
| 9 | 1-ethyl-4-methyl-6-hydroxy-pyridone-(2)-3-carbonamide | greenish yellow |
| 10 | 1-hydroxynaphthalene-3,6-disulphonic acid | orange |
| 11 | 1-hydroxynaphthalene-4,8-disulphonic acid | red |
| 12 | 1-(4',6',8'-trisulphonaphthyl-[2'])-3-methyl-5-pyrazolone | yellow |
| 13 | acetoacetanilide-4-sulphonic acid | greenish yellow |
| 14 | 1-ethyl-4-methyl-6-hydroxy-pyrid-(2)-one | " |

EXAMPLE 4

12.76 Parts of 1-hydroxy-8-amino-naphthalene-3,6-disulphonic acid are dissolved to a clear solution in 250 parts of water which is at room temperature and contains sodium hydroxide solution. This solution is treated with 13.1 parts of anhydrous sodium acetate and, while stirring vigorously, a solution of 7.78 parts of N,N-bis-(4,6-dichloro-s-triazinyl-(2))-aniline in 40 parts of acetone is added thereto and the whole mixture is allowed to react for about 24 hours.

To the clear solution of the so obtained reactive coupling component is then added the diazo component which is prepared in the conventional manner from 6.92 parts of orthanilic acid.

Upon completion of the coupling the resulting dyestuff is isolated with a mixture of sodium chloride and potassium chloride, filtered off, and dried in vacuo at 50°–60° C.

The so obtained dyestuff dyes cotton in bluish red shades.

EXAMPLE 5

A neutral solution of 10.62 parts of 1-amino-4-(3'-amino-2',4',6'-trimethyl-anilino)anthraquinone-2,5'-disulphonic acid is treated with 13 parts of anhydrous sodium acetate and to the mixture is added an acetonic solution of 7.78 parts of N,N-bis-[4,6-dichloro-s-triazinyl-(2)]-aniline. Upon completion of the condensation, a neutral solution of 10.9 parts of 2-(4'-amino-2'-ureidophenylazo) naphthalene-3,6,8-trisulphonic acid is added to the reaction mixture and the whole mixture is allowed to react for 24 hours.

In this manner there is obtained a dyestuff which dyes cotton in green shades.

Dyeing Instruction I

2 Parts of the dyestuff obtained according to Example 1 are dissolved in 100 parts of water with the addition of 0.5 parts of sodium m-nitrobenzene-sulphonate. A cotton fabric is impregnated with the resulting solution, so that its weight increases by 75%, and then it is dried.

Then the fabric is impregnated with a warm (20° C) solution containing 5 g of sodium hydroxide and 300 g of sodium chloride per liter and it is squeezed out to give 75% increase in weight. The dyed fabric is dried for 20 to 30 seconds at 100° to 101° C, rinsed, soaped for a quarter of an hour in a 0.3% boiling solution of a non-ionic detergent, rinsed and dried.

Printing Instruction

While stirring rapidly, 2 parts of the dyestuff manufactured according to Example 2 are sprinkled into 100 parts of a stock paste containing 45 parts of 5% sodium alginate thickening, 32 parts of water, 20 parts of urea, 1 part of sodium m-nitrobenzenesulphonate and 2 parts of sodium carbonate.

A cotton fabric is printed on a roller printing machine with the so obtained printing paste and the resulting printed fabric is steamed for 1 to 2 minutes at 100° C in saturated water vapour. The printed fabric is then thoroughly rinsed in cold and hot water, in the process of which the non-chemically fixed amounts are very easily removed from the fibres, and the fabric is subsequently dried.

Dyeing Instruction II

2 Parts of the dyestuff obtained according to Example 1 are dissolved in 100 parts of water.

The solution is added to 3900 parts of cold water, 80 parts of sodium chloride are added and 100 parts of cotton fabric are put into this dyebath. The temperature is raised in 45 minutes to 90° C, and after 30 minutes 40 parts of trisodium phosphate and a further 80 parts of sodium chloride are added. The temperature is maintained for 30 minutes at 90° C, the fabric is rinsed and then soaped for 15 minutes in a 0.3% boiling solution of a non-ionic detergent, then rinsed and dried.

There results a dyeing which is fast to washing and light.

I claim:

1. A dyestuff of the formula

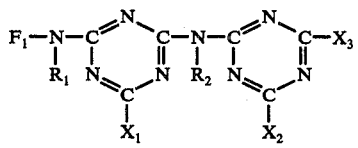

wherein $F_1$ is an azo dyestuff radical, $R_1$ is hydrogen, lower alkyl, or phenyl, $R_2$ is hydrogen, lower alkyl, chloro-lower alkyl, bromo-lower alkyl, cyano-lower alkyl, hydroxy-lower alkyl, lower alkoxy-lower alkyl, benzyl or phenyl, $X_1$ and $X_2$ each is chloro, bromo or fluoro, and $X_3$ is chloro, bromo, fluoro, lower alkyl, phenyl, lower alkylthio, phenylthio, lower alkoxy, phenoxy, amino, lower alkyl-amino, di-(lower alkyl)amino, phenylamino, phenyl(lower alkyl)-amino, benzylamino, hydroxylamino, hydrazino, phenyl hydrazino, morpholino, piperidino, piperazino or $-N(R_3)-F_2$, wherein $R_3$ is hydrogen, lower alkyl, or phenyl, and $F_2$ is an azo dyestuff radical.

2. The dyestuff of claim 1, wherein $R_1$ is hydrogen, $X_1$ and $X_2$ are chloro.

3. The dyestuff of claim 2, wherein $X_3$ is $-N(R_3)-F_2$ and $R_3$ is hydrogen.

4. The dyestuff of claim 1, wherein $R_2$ is phenyl.

5. The dyestuff of claim 2, wherein $R_2$ is phenyl.

6. The dyestuff of claim 3, wherein $R_2$ is phenyl.

* * * * *